April 25, 1967  J. E. EICHENLAUB  3,315,656
HEATING DEVICE
Filed Oct. 27, 1964  3 Sheets-Sheet 1
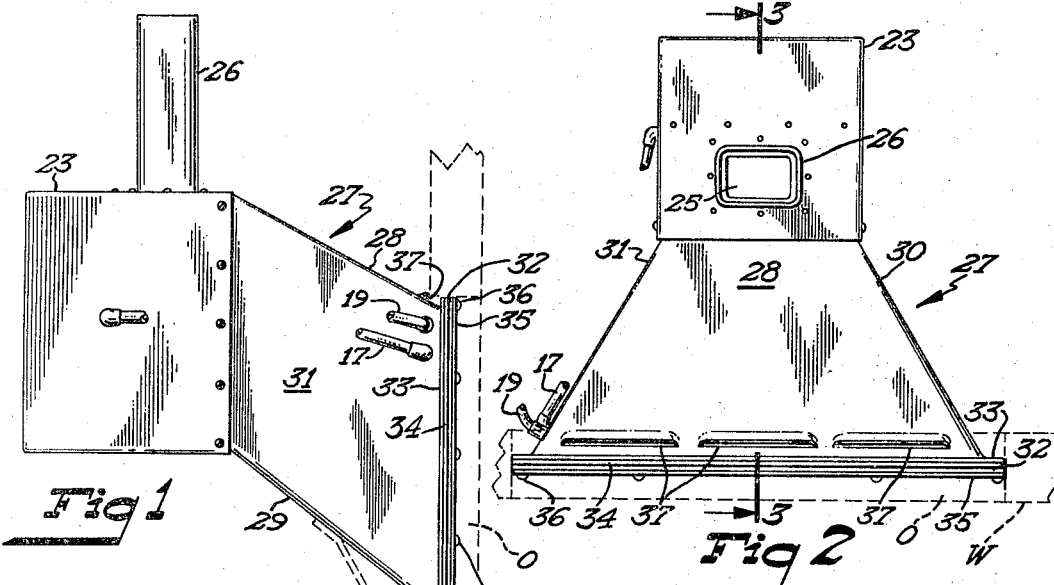
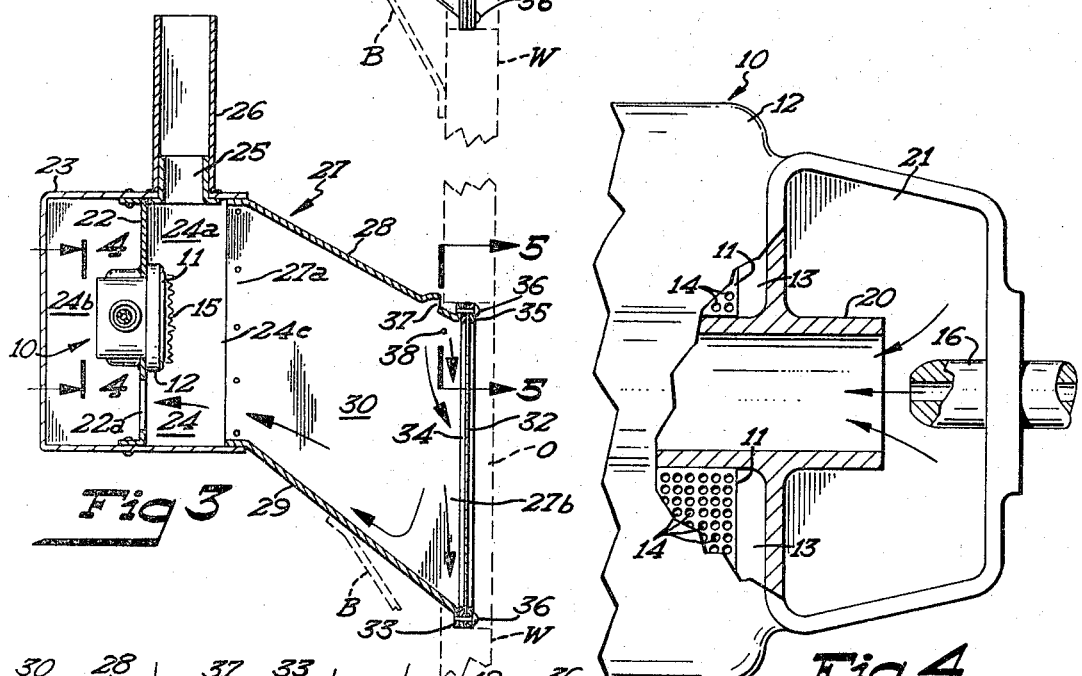
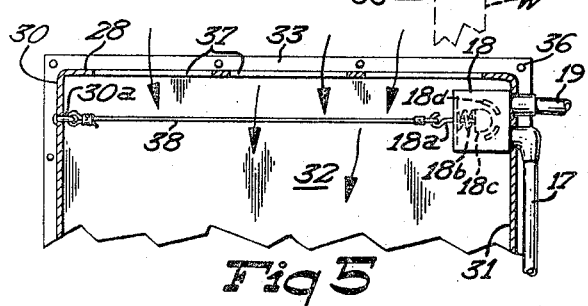
INVENTOR.
JOHN E. EICHENLAUB
BY
*Williamson & Palmatier*
ATTORNEYS April 25, 1967
J. E. EICHENLAUB
3,315,656
HEATING DEVICE
Filed Oct. 27, 1964
3 Sheets-Sheet 2
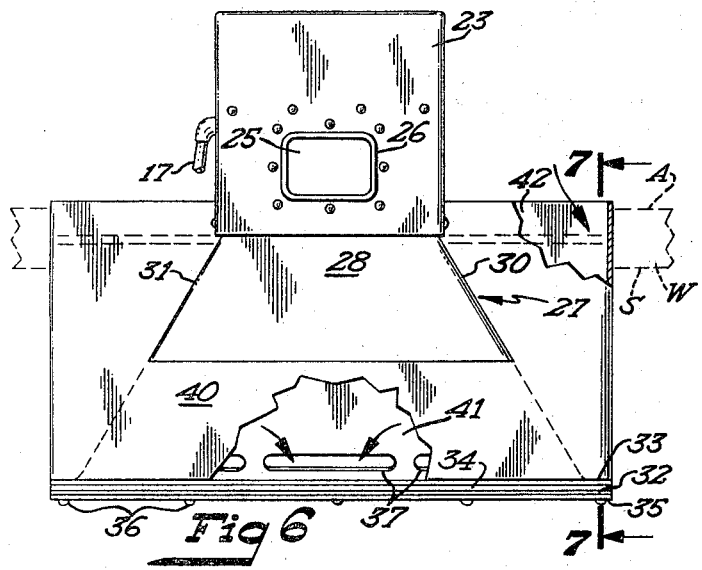
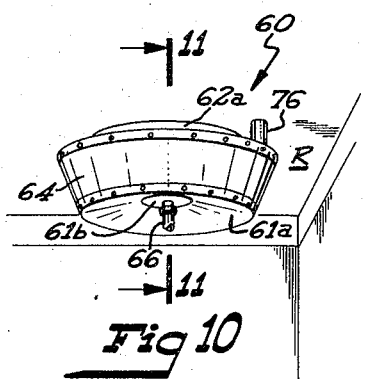
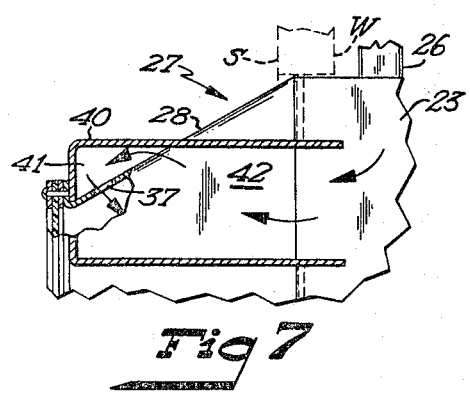
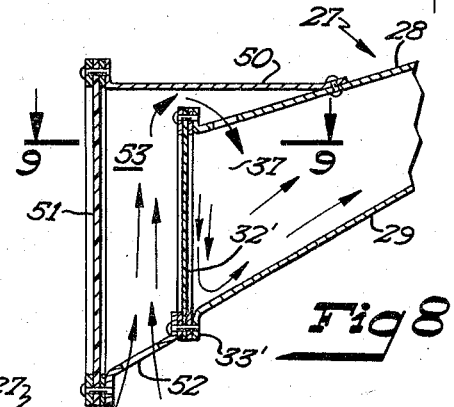
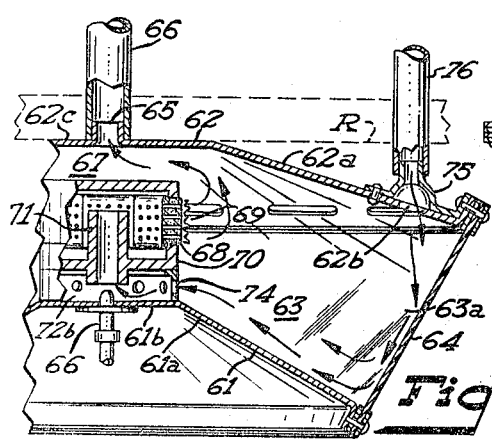
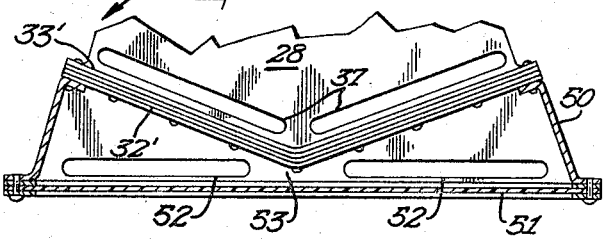
INVENTOR.
JOHN E. EICHENLAUB
BY
Williamson & Palmatier
ATTORNEYS April 25, 1967  J. E. EICHENLAUB  3,315,656
HEATING DEVICE Filed Oct. 27, 1964  3 Sheets-Sheet 3

INVENTOR
JOHN E. EICHENLAUB
BY
Williamson & Palmatier
ATTORNEYS

United States Patent Office 3,315,656
Patented Apr. 25, 1967

3,315,656
HEATING DEVICE
John E. Eichenlaub, 9321 W. Franklin Ave.,
Minneapolis, Minn. 55426
Filed Oct. 27, 1964, Ser. No. 406,759
20 Claims. (Cl. 126—92)

This invention relates to a space heating device and more particularly to an apparatus for directing, primarily, radiant heat into the space to be heated.

An object of my invention is to provide a new and improved space heating device of simple and inexpensive construction and operation.

Another object of my invention is to provide a novel space heating device directing radiant heat into the space from a fuel fired source of heat which is isolated from and maintained entirely seperate from the space to be heated to minimize any likelihood of allowing combustion gases to flow from the fuel fired source of heat into the space to be heated.

Still another object of my invention is to provide a novel space heating device directing radiant heat into the space from a fuel fired source of heat which is isolated from and disposed at the exterior of the space to be heated, and providing for the transmission of radiant heat through an opening in the wall of the space being heated, whereby the combustion gases will be readily and easily discharged at a location remote from the space being heated.

Still another object of my invention is to provide a novel and new space heating device directing radiant heat from a fuel fire-heated radiator, through a radiant energy transmissible panel for heating the space, and also through counter-flowing combustion air which sweeps across said panel to maintain the panel at reasonable and safe temperatures.

A further object of my invention is to provide an improved space heating device wherein the fuel fired source of heat is isolated from the space being heated by a radiant heat transmissible panel constructed of flexible film type material which is tough and durable and therefore resistant to physical damage and which is also resistant to heat, but is adequately cooled by the inwardly flowing combustion air for the fuel fired source of heat.

These and other objects and advantages of my invention will more fully appear from the following description made in connection with the accompanying drawings, wherein like reference characters refer to the same or similar parts throughout the several views, and in which:

FIG. 1 is a side elevation view of the present invention shown in one possible relationship to a building wall so as to be disposed substantially completely outside the building wall while directing radiant heat through an opening in the building wall to the space to be heated.

FIG. 2 is a top plan view of the apparatus shown in FIG. 1.

FIG. 3 is a longitudinal section view taken approximately at 3—3 in FIG. 2.

FIG. 4 is an enlarged detail view taken approximately at 4—4 in FIG. 3 and being partially broken away for clarity of detail.

FIG. 5 is a detail section view taken approximately at 5—5 in FIG. 3.

FIG. 6 is a top plan view of a slightly modified form of the invention.

FIG. 7 is a detail section view taken approximately at 7—7 of FIG. 6.

FIG. 8 is a longitudinal section view of still another modified form of the invention.

FIG. 9 is a detail section view taken at 9—9 in FIG. 8.

FIG. 10 is a perspective view illustrating another form of the invention.

FIG. 11 is an enlarged detail section view taken approximately at 11—11 of FIG. 10.

Figure 12:
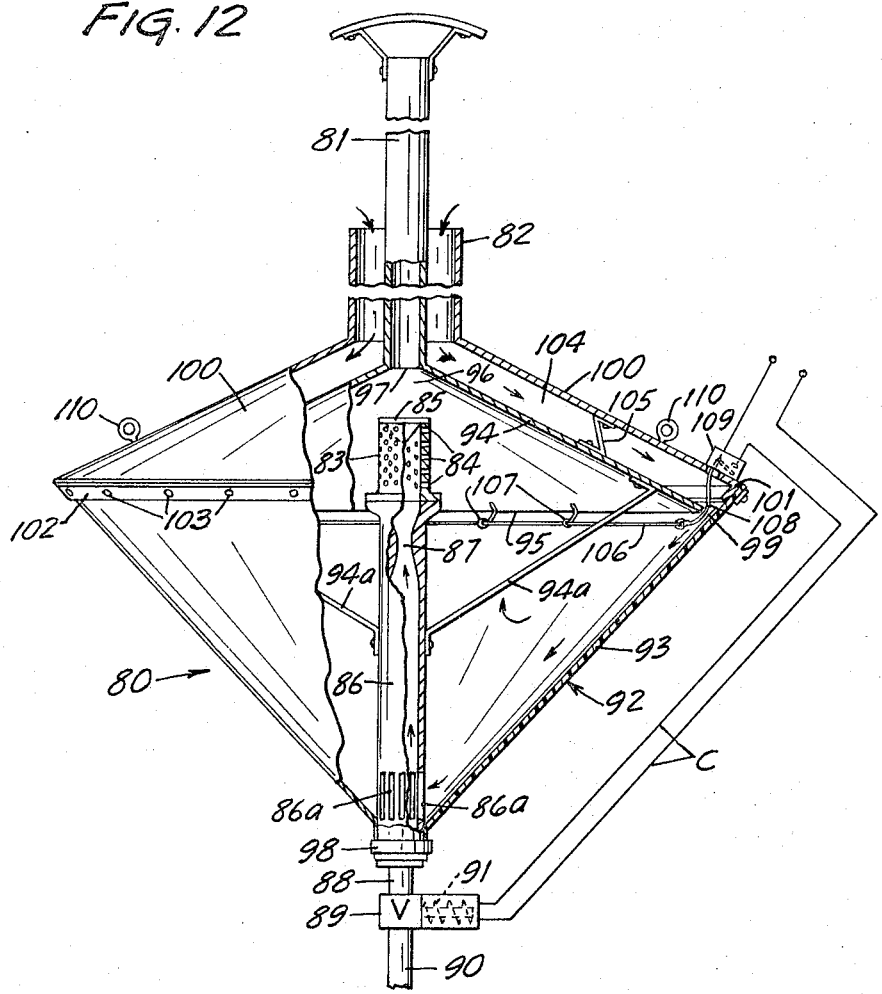
FIG. 12 is an elevational view, partly in section of another form of the invention.

One form of the invention is illustrated in FIGS. 1–5 and includes a fuel fired source of radiant heat which is indicated in general by numeral 10 and which includes a heat radiating panel 11. Panel 11 may be constructed of ceramic material or other material resistant to deterioration under influence of fire. The panel 11 forms the front wall of a housing 12 having an interior chamber 13 wherein gas and air are thorougly mixed and then discharged directly through the panel 11 and through the multiplicity of apertures 14 therein. The combustible gas flows outwardly through the apertures 14 and a flame 15 exists directly adjacent the front face of panel 11 at its exterior side. It will be noted that the gas is supplied through a nozzle 16 which is connected to a conduit 17 controlled by valve 18 which receives the gas from a suitable source 19, which in the form shown comprises a hose or a gas conduit. The gas is directed from the nozzle 16 into a conduit 20 formed integrally with the housing 12 in order to produce adequate mixing of air which is directed through the open rear of the air supply chamber 21 and then into the interior of the conduit 20 along with the gas from the nozzle.

The housing 12 is mounted in a mounting panel 22 which may be constructed of sheet metal and which is affixed in a housing 23, the interior of which defines the combustion chamber 24 for the fuel fired source of heat 10. It will be noted that the front portion 24a of the combustion chamber communicates upwardly with a combustion gases discharging vent 25 in the top wall of the housing 23, and a short stack 26 is attached to the vent 25.

The rear portion 24b of the combustion chamber communicates with the front portion 24a of the combustion chamber through the panel 22 at the enlarged air transmitting opening 22a disposed below the housing 12.

The open front side 24c of the combustion chamber is connected to and communicates directly with the radiant heat receiving rear side 27a of the duct 27 which has downwardly inclined top and bottom walls 28 and 29 which flare with respect to each other, and the sidewalls 30 and 31 which also flare divergently from the radiant heat receiving rear side 27a of the duct and toward the radiant heat discharging forward side 27b.

The radiant heat discharging front side 27b of the duct 27 confronts and is connected to a radiant heat transmissible panel 32 which, in the form shown, is constructed of a pliable but tightly stretched film type plastic material of a tough and resilient nature, but resistant to substantial heat up to its melting temperature of approximately 350 degrees. One example of said film type material is fluorohydrocarbon film, one form being commercially known as Aclar 33a which is made and distributed by the General Chemical Division of Allied Chemical Company, 61 Broadway, New York, N.Y. Preferably the radiant heat transmissible panel 32 absorbs only a very small amount of radiant energy so as to minimize the heating of the panel as the radiant heat passes through. The material above mentioned, absorbs less than an estimated two percent (2%) of the infrared rays passed in panel thicknesses of approximately two mils.

In the form illustrated, the duct 27 has a peripheral flange or lip 33 at the radiatn heat discharging end. The panel 32 and gasket 34 are retained on the lip 33 by a rigid clamping ring 35 which is secured by screws 36 to the lip 33.

The top wall 28 of the duct is provided with air inlet openings 37 all along the top edge of the panel 32, and the air inlet openings 37 in the top panel 28 provide the sole source of combustion air for the fuel fired source of heat 10. It is to be noted that the air inlet openings 37 are disposed immediately adjacent the front lip 33 of the duct so that the air, moving inwardly through the inlet openings 37 sweeps directly downwardly across the entire panel 32 and entirely to the bottom wall 39 of the duct and thence upwardly along the duct 27 in a direction opposite to the radiant energy being transmitted through the duct from the ceramic panel 11.

It has been found that the temperature within the duct 27, at most areas therein approximate 180 to 190 degrees while the air is sweeping upwardly toward the opening 27 in the panel 22. This temperature within the duct 27 is well below the melting temperature of approximately 350 degrees of the heat transmissible panel 34. It will be understood that the air moving inwardly through the inlet openings 37 will be considerably cooler than the temperatures within the duct 27 and therefore the inwardly moving air moves directly downwardly across the panel 32 to produce and maintain cooling of the panel 32 and prevent temperatures of the panel from rising above permissible levels.

It will be noted that the valve 18 which controls the supply of gas fuel for the source of heat 10, is disposed within the duct 27 and is mounted on the sidewall 31 adjacent the top wall 28 (see FIG. 5). The valve 18 has a valve stem 18a which is normally urged by spring 18b to move the valve element 18c against its seat 18d so as to close the valve and shut off the supply of gas fuel for the source of heat 10, but the valve is prevented from closing by a fuse 38 which constitutes a length of meltable plastic thread which is anchored to the valve stem 18a and also anchored on a fastener 30a at the opposite sidewall of the duct so as to be disposed immediately inwardly from the air inlet openings 37 and adjacent the top edge of the panel 32. The plastic thread or fuse 38 has a melting temperature of approximately 190 degrees so that in the event the air stops flowing inwardly through the openings 37 to maintain the fuse 38 in cool condition, the fuse 38 will melt and the valve 18 will close to shut off the supply of fuel for the source of heat 10. One possible condition which could effect melting of the fuse 38 might be the rupturing of the panel 32 due to physical damage thereto as by impact or tearing of some foreign objects. In this event, the combustion air would be at least partially supplied through the rip or tear in the panel 32 so as to reduce the amount of air moving inwardly through the inlet openings 37 and the cooling of the fuse 38 would therefore be inadequate to maintain its proper low temperature.

In the operation of the invention, the ceramic panel 11 is normally heated to a red hot temperature by the flame 15 at its front surface so that the ceramic panel actually glows. Radiant heat is transmitted through the front open side 24c of the combustion chamber, and into the open rear side 27a of the duct and thence downwardly through the duct and outwardly through the open front side 27b of the duct and outwardly through the heat transmissible panel 32 and into the space which is to be heated. While such radiant heat is being transmitted obliquely downwardly through the duct 27, a portion of the radiant heat will engage the inner surfaces of the walls of the duct, and these inner surfaces are of a heat reflective nature so as to cause the radiant heat to move on through the duct and outwardly through the panel 32. While the radiant heat is moving in one direction through the duct 27, the drawn-in combustion air is moving in the opposite direction from the panel 32 and toward the flame 15. Actually the combustion air utilized at the flame 15 is directed through the opening 27 of panel 22, and thence inwardly through the conduit 20 along with the gas supplied from the nozzle 16 wherein the gas and air are mixed and directed through the chamber 13 and outwardly through the apertures 14 of the ceramic panel 11. The combustion gases with some entrained air move directly upwardly through the vent 25 and stack 26. If desired, the inwardly drawn air, after sweeping downwardly across the panel 32, could be shunted out of duct 30 and through additional ductwork, directly into the rear portion 24b of the combustion chamber 24.

In this form of the invention, it is expected that the front side of the duct 27 will be disposed in an opening O in a building wall W or in the wall of a vehicle or other space-defining wall. The opening O in the wall W may be a window opening or may be cut particularly to receive the end of the duct 27. The duct may be supported in predetermined relation with the wall by any suitable means such as a bracket B.

It has been experienced that there is some heating of the top and bottom and sidewalls of the duct 27, and therefore when the entire duct is disposed outside of the wall W of the building, some quantity of heat is lost by convection through the walls of the duct. In the form of the invention illustrated in FIGS. 6 and 7, the duct 27 is mounted in relation to the wall W so that the duct 27, or a substantial portion of it, is disposed inwardly of the inner side S of the wall and therefore in the space to be heated. Heat that is transmitted outwardly from the duct 27 as by convection is therefore recovered for heating the space into which the radiant heat is also directed. In this form of the invention, all of the apparatus employed in FIGS. 1–5 is incorporated into the structure illustrated, and in addition, the duct 27 is provided with additional walls 40 affixed to the exterior of duct 27 and defining an inlet air manifold 41 overlying the air inlet openings 37 in the top wall 28 of the duct. The walls 40 also define air conduits 42 at each side of the duct 27. The conduits 42 open in outward directions so as to draw air from the outer side A of the wall W.

In the form of the invention illustrated in FIGS. 8 and 9, the heating device is substantially identical to that illustrated in FIGS. 1–5 and includes all the essential components illustrated therein. The duct 27, in this form of the invention has the top and bottom walls 28 and 29 formed so that the front edges and the panel mounting flanges 33' thereof are substantially V-shaped, substantially as illustrated in FIG. 9. The heat transmissible panel 32' has portions thereof facing in oblique relation with respect to each other. A substantially tubular, but slightly flaring enclosure 50 is affixed in its rear end to the periphery of the duct 27, and the open front of the enclosure 50 mounts a second radiant heat transmissible panel 51 of slightly greater thickness than the panel 32'. The panel 51 lies in a plane and it will therefore be seen that the panel 51 is in nonparallel relation to the panel 32' which prevents the multiple reflection of radiant heat rays back and forth between the panels and therefore prevents any build up of heat at the panels due to such reflected rays. The panel 51, being somewhat heavier and thicker than the panel 32' provides a substantial degree of protection against physical harm for the panel 32'. The enclosure 50 has air inlet openings 52 in the bottom thereof adjacent the bottom edge of panel 51 so that the air will be directed upwardly through the space 53 defined by the enclosure and thence inwardly of the air inlet openings 37 in the duct 27. In the fashion described previously, the air will flow downwardly directly along and across the panel 32' to thoroughly cool the panel 32' and thence the air will be directed upwardly to the source of heat 10.

In the form of the invention illustrated in FIGS. 10 and 11, the heating device is indicated in general by numeral 60 and is intended primarily to be mounted adjacent the ceiling or roof R of a building and on the inside of the roof R.

The heating device includes a bottom panel 61 and a top panel 62. The peripheral portions 61a and 62a thereof are conically shaped and obliquely downwardly oriented in the spaced and confronting relation with each other and in slightly diverging relation with each other to define generally annular, and obliquely downwardly extending duct 63. The radiant heat discharging front side 63a of the duct is enclosed and sealed by a radiant heat transmissible panel 64 which is constructed of material identically to the panel 32 of the form of the invention illustrated in FIGS. 1–5, and the panel 64 is also substantially conically shaped to confront the entire periphery of the generally annularly shaped duct 63 and to discharge radiant heat downwardly from the entire periphery of the duct. The panel 62 has a plurality of air inlet slot openings 62b adjacent the panel 64 so as to direct combustion air inwardly adjacent the panel 64 whereby the air will flow downwardly across the entire periphery of panel 64 and thence upwardly through the duct 63.

It will be seen that the upper panel 62 has a generally flat central portion 62c wherein a vent 65 is defined for mounting of a stack 66 thereon.

The panel 61 also has a flat central portion 61b through which a gas nozzle 66 extends into the combustion chamber 67. The combustion chamber 67 contains a plurality of ceramic heat radiating panels 68 which are perforated as hereinbefore described in connection with radiators 11 so as to permit air and gas to be transmitted through the perforated panels 68 and cause a flame 69 to burn on the front face of the ceramic panels. The panels 68 are mounted within the periphery of a generally cylindrical housing 70, through the bottom of which extends a gas and air conduit 71 for receiving gas from the nozzle 66 and receiving air from the plenum chamber 72 having a peripheral wall 73 with air supply openings 74 therein and communicating with duct 63 around its entire periphery.

It will be noted that the air inlet openings 62b in the top panel 62 are enclosed by a manifold 75 which extends around the entire periphery of panel 62 and which is supplied with air from an air supply conduit 76 preferably extending upwardly through the roof for bringing fresh air to the manifold for combustion.

In this form of the invention illustrated in FIGS. 10 and 11 the device may be used for space heating in commercial garages and other large spaces to be heated. It will be understood that although the form of the invention as shown in FIGS. 10 and 11 is cylindrical, or annular, the functioning and advantages of the invention are substantially identical to that form of the invention illustrated in FIGS. 1–5 with the added advantage that heat is directed in multiple directions at any one time. It will be understood that instead of making the heating device cylindrical as illustrated in FIGS. 10 and 11, such a heating device could be merely two sided as to direct heat in two directions at one time instead of in multiple directions all around the periphery of the annular heating device as illustrated.

In the form of the invention illustrated in FIG. 12, the heating apparatus 80 is well adapted for mounting in a room in an overhead position for directing heat downwardly; and in this form of the invention it will be noted that a stack 81 is provided to extend upwardly and through a roof structure of a building as to carry the combustion gases to the out-of-doors. An air inlet conduit 82 concentrically encompasses the stack 81 to take in fresh air from the out-of-doors and supply it into the fuel burning apparatus.

In this form of the invention, a fuel fired source of radiant heat is provided by a generally cylindrical radiator 83 which is constructed of a ceramic-like material or other suitable material which is highly resistant to extreme heat as provided by a gas flame. The radiator 83 has a plurality of apertures 84 in the peripheral wall, and in the drawings the apertures are shown to be of sufficient size as to be visible, however the apertures may be very considerably smaller than that proportion illustrated in the drawing. The apertures 84 carry an air and gas mixture so as to effect burning of the gas at the outer peripheral surface of the radiator 83, thereby very substantially heating the radiator 83 and cause radiation of a substantial amount of heat therefrom. The radiator 83 carries a heat resistant cone shaped inset 85 to direct the air-gas mixture outwardly through the apertures 84. The radiator 83 is carried in any suitable manner as to provide an air-gas mixture thereto for efficient burning and in the form shown, a rigid air-gas supply conduit 86 supports a radiator on its upper end and embodies a restriction 87 adjacent the upper end for providing a venturi for the air-gas mixture. The lower end of the conduit 86 is connected in gas flow communication with a gas supply pipe 88 having a gas valve 89 therein to control the supply of gas to the radiator 83 from the source pipe 90. The valve 89 may be of any suitable type and in the form shown is preferably operated by an electric solenoid 91.

The conduit 86 also has a plurality of air-receiving slot apertures 86a which direct combustion air into the conduit 86 for mixture with the gas from the source of supply pipe 90. The lower end of the conduit 86 may be provided with a jet, below the slot aperture 86a in order to produce a speed of gas flow from the pipe 88 as to entrain the entering combustion air.

As in the other forms of the invention the radiator 83 is entirely encompassed within an enclosure which is indicated in general by numeral 92, of which, the lower portion of conduit 86, the radiant heat transmissible panel 93 and the inclined top wall 94 are the principal parts.

It is to be noted that the top wall 94 is inclined upwardly from the annular peripheral edge 95 thereof to the central portion 96 in a conical manner. The upper central portion 96 of the top wall 94 defines the combustion gases discharging vent 97 to which the stack 81 is connected. The metallic top wall 94 has a reflective inner or lower surface so that the radiant heat or infrared rays from the radiator 83 are reflected outwardly and downwardly therefrom.

The radiant heat transmissible panel 93 is constructed of a plastic material substantially identical to the material hereinbefore described in connection with panel 32 illustrated in FIG. 1 et seq. The plastic radiant heat transmissible panel 93 is imperforate and is generally conically shaped so as to converge downwardly to the lower portion of conduit 86 to which the panel 93 is secured as by an annular clamp 98. The peripheral edge 95 of the top wall 94 is spaced slightly from the plastic panel 93 as to provide the enclosure 92 with an air inlet 99 around the entire periphery of the top wall 94 and adjacent the upper portion of the plastic panel 93.

As the air enters at the air inlet 99, the air progressively moves downwardly along the inner surface of the panel 93 as indicated by the arrows in FIG. 12 and into the slot apertures 86a of conduit 86 mixing with the gas. A certain portion of the air entering at the air inlet 99 may also move upwardly through the open space encompassed by the panel 93 to the vent 97. The air moving downwardly along the panel 93 effects a cooling of the panel 93 as to prevent radiant heat from the radiator 93 from excessively raising the temperature of the panel 93 and causing damage thereto.

It will be noted that the gas-air conduit 86 may be rigidly interconnected to the top wall 94 as by braces 94a.

Means are provided for mounting the upper portion of the plastic panel 93 and for supplying air to the annular air inlet 99, and in the form shown such means comprise a generally conically shaped hood or outer wall 100 having a flanged outer edge portion 101 to which the upper and outer peripheral edge portion of the plastic panel 93 is clamped as by a rigid clamping strip 102 and screws 103. It will be seen that the hood 100 is spaced above the top wall 94 to provide an annular air supply manifold 104 receiving air from the conduit 82 which is affixed to and carried by the hood 100. Suitable brackets 105 are provided to interconnect the hood 100 to the top wall 94 while allowing air flow downwardly through the space 104 in the direction of the arrows.

In the event that heat of combustion migrates, for any reason, downwardly along the top wall 94 and toward the edge 95 thereof, a plastic thread or fuse 106 is carried on the lower edge of the top wall as by eyelets 107, and the plastic thread or fuse 106, which is constructed of a material substantially identical to the thread or fuse 38 (see FIG. 5), normally retains switch operator 108 to prevent switch 109 from closing. In the event that the plastic thread or fuse 106 melts under influence of excessive heat, the switch 109 is allowed to close to supply power from the terminals T by conductors C to the solenoid 91 so as to close the valve 89 to thereby shut down the apparatus 80 all together.

Of course it will be understood that various changes may be made in the form, details, arrangement and proportions of the various parts without departing from the scope of my invention.

I claim:

1. Fuel burning apparatus directing heat into a space, comprising a fuel fired source of radiant heat, means defining an enclosure encompassing said fuel fired source of radiant heat and having a combustion gases discharging vent, said enclosure also having an inclined top wall with a lower edge and a heat reflective inner surface, said enclosure also having an imperforate radiant heat transmissible panel extending transversely of said top wall and downwardly below said lower edge, said panel having an upper edge portion adjacent the lower edge of said top wall and also having a lower portion, said enclosure also having an air inlet opening adjacent the lower edge of said top wall for supplying air for combustion and for sweeping by convection downwardly across said panel and toward the lower portion thereof for cooling the panel,
and means securing said fuel fired source of radiant heat within the enclosure in generally confronting relation with said panel for directing radiant heat therethrough and in a predetermined relation with said top wall for causing heat radiated against the top wall to be reflected outwardly through the panel.

2. Fuel burning apparatus directing heat into a space, comprising a fuel fired source of radiant heat, means defining an enclosure entirely encompassing said fuel fired source of radiant heat, said enclosure having a top wall with an annular outer edge and a central portion elevated above said edge, the elevated central portion of said top wall defining a combustion gases discharging vent, the top wall having a heat reflective inner surface, said enclosure also having a generally annular and imperforate radiant heat transmissible panel extending transversely downwardly of said top wall and adjacent said annular outer edge, said panel having an upper edge portion adjacent the outer edge of said top wall and also having a lower portion, said enclosure having air inlet means adjacent the outer edge of said top wall for supplying air into said enclosure for combustion and for sweeping by convection downwardly across said panel and toward the lower portion thereof for cooling the panel,
and means securing said fuel fired source of radiant heat within the enclosure and generally centrally of said annular panel in confronting relation therewith for directing radiant heat in multiple outward and downward directions through said panel and as to cause heat radiated against said heat reflective top wall to be reflected outwardly through said panel.

3. The fuel burning apparatus of claim 2 and including air directing means adjacent the lower portion of said imperorate panel for receiving air convected downwardly across said panel and directing said air to the fuel fired source of radiant heat.

4. The fuel burning apparatus of claim 2 wherein said enclosure has a bottom wall with an annular outer edge attached to the lower portion of said imperforate panel, said bottom wall receiving air convected downwardly across said panel and directing said air centrally of the enclosure toward said fuel fired source of radiant heat.

5. The fuel burning apparatus of claim 2 wherein said imperforate radiant heat transmissible panel has a generally conical shape converging in a downward direction whereby to transmit radiant heat over a broad range of downward and outward directions.

6. The fuel burning apparatus of claim 5 wherein said generally conical heat transmissible panel has a convergent lower portion,
a gas fuel supplying conduit extending upwardly through said convergent lower portion of said panel and to said fuel fired source of radiant heat,
and means securing said lower convergent portion of said panel to said conduit.

7. Fuel burning apparatus directing heat into a space, comprising a fuel fired source of radiant heat, means defining an enclosure entirely encompassing said fuel fired source of radiant heat, said enclosure having a top wall with an annular outer edge and a central portion elevated above said edge, the elevated central portion of said top wall defining a combustion gases discharging vent having a stack extending upwardly therefrom, the top wall having a heat reflective inner surface, said enclosure also having a generally annular and imperforate radiant heat transmissible panel extending transversely downwardly of said top wall and adjacent said annular outer edge, said panel having an upper edge portion adjacent the outer edge of said top wall and also having a lower portion, said enclosure having air inlet means adjacent the outer edge of said top wall for supplying air into said enclosure for combustion and for sweeping by convection downwardly across said panel and toward the lower portion thereof for cooling the panel,
means defining an air supply conduit in superposed relation with the outer edge of said top wall and supplying air to said air inlet means,
and means securing said fuel fired source of radiant heat within the enclosure and generally centrally of said annular panel in confronting relation therewith for directing radiant heat in multiple outward and downward directions through said panel and as to cause heat radiated against said heat reflective top wall to be reflected outwardly through said panel.

8. The fuel burning apparatus of claim 7 wherein said air supply conduit has an air receiving end in encompassing and substantially concentric relation with said stack.

9. Fuel burning apparatus directing heat into a space, comprising a fuel fired source of radiant heat, means defining an enclosure entirely encompassing said fuel fired source of radiant heat, said enclosure having a top wall with an annular outer edge and a central portion of said top wall defining a combustion portion elevated above said edge, the elevated central gases discharging vent having an upwardly extending stack carrying said gases from the vent, the top wall also having a heat reflective inner surface, said enclosure also having a generally annular and imperforate radiant heat transmissible panel extending transversely downwardly of said top wall and adjacent said annular outer edge, said panel having an upper edge portion in spaced and confronting relation with the annular outer edge of said top wall and cooperating therewith in defining a substantially annular air inlet supplying air into said enclosure for combustion and for sweeping by convection downwardly across said panel for cooling the panel,
an air-flow confining hood spaced above said top wall and cooperating therewith in defining an air supply conduit substantially concentric with said stack, said hood having an annular outer edge attached to the upper edge portion of said heat transmissible panel, and means securing said fuel fired source of radiant heat within the enclosure and generally centrally of said annular panel in confronting relation therewith for directing radiant heat in multiple outward and downward directions through said panel and as to cause heat radiated against said heat reflective top wall to be reflected outwardly through said panel.

10. Fuel burning apparatus directing heat into a space, comprising a fuel fired source of radiant heat, means defining an enclosure entirely encompassing said fuel fired source of radiant heat and having a combustion gases discharging vent, said enclosure having an inclined top wall with a lower edge and a heat reflective inner surface, said enclosure also having sidewalls depending from said top wall and cooperating therewith in defining a radiant heat transmitting duct, the sidewalls having heat reflective inner surfaces, said enclosure also having an imperforate planar radiant heat transmissible panel extending transversely downwardly of said top wall and adjacent said lower edge, said panel having an upper edge portion adjacent the lower edge of said top wall and also having a lower portion, said enclosure also having an air inlet opening adjacent the lower edge of said top wall for supplying air for combustion and for sweeping by convection downwardly across said panel and toward the lower portion thereof for cooling the panel, and means securing said fuel fired source of radiant heat within the enclosure and in generally confronting relation with said panel for directing radiant heat therethrough and in predetermined relation with said top wall and duct for causing heat radiated against the reflective inner surfaces to be reflected outwardly through the panel.

11. Fuel burning apparatus directing heat into a space, comprising a fuel fired source of radiant heat, means defining an enclosure entirely encompassing said fuel fired source of radiant heat and having a combustion gases discharging vent, said enclosure also having an inclined top wall with a lower edge and a heat reflective inner surface, said enclosure also having a bottom wall with a heat reflective inner surface and an outer edge spaced well below the lower edge of said top wall, said enclosure also having an imperfroate and substantially planar radiant heat transmissible panel extending transversely downwardly of said top wall and to said bottom wall, said panel having an upper edge portion adjacent the lower edge of said inclined top wall and also having a lower portion adjacent the outer edge of said bottom wall, said enclosure also having an air inlet opening adjacent the lower edge of said top wall for supplying air for combustion and for sweeping by convection downwardly across said panel and toward the power portion thereof for cooling the panel and sweeping upwardly along said bottom wall, and means securing said fuel fired source of radiant heat within the enclosure in generally confronting relation with said panel for directing radiant heat therethrough and in predetermined relation with said top and bottom walls for causing heat radiated against said walls to be reflected outwardly through the panel.

12. The fuel burning apparatus of claim 11 and said enclosure also having opposite sidewalls confronting each other in widely spaced relation and depending from said top wall to said bottom wall and cooperating therewith in defining a duct transmitting radiant heat from said fuel fired source of radiant heat outwardly through said panel, said sidewalls also having heat reflective inner surfaces to reflect radiant heat outwardly from said fuel fired source of radiant heat to and through said panel.

13. The fuel burning apparatus of claim 1 and including a second imperforate radiant heat transmissible panel confronting a first-mentioned of said panels in spaced relation and transmitting the radiant heat transmitted therethrough, and means connected with said second panel and also connected with said enclosure and cooperating with said enclosure and second panel in defining an air supply passage communicating with said air inlet opening and supplying air for combustion and for cooling both of said panels.

14. The fuel burning apparatus of claim 11 and including a second planar radiant heat transmissible panel spaced outwardly from said enclosure in confronting relation with the first mentioned of said panels and transmitting radiant heat supplied thereto, and duct work means connected with said second panel and with said enclosure and defining an air passage communicating with said air inlet opening for supplying air for combustion and for sweeping across both of said panels for cooling.

15. Fuel burning apparatus directing heat into a space, comprising a fuel fired source of radiant heat, said source also producing incidental heated combustion gases, wall means directing radiant heat outwardly and confining said heated combustion gases for upward movement as by convection, said wall means including a radiant heat reflecting inclined wall having an upper portion disposed above said source of heat and having a lower edge portion, said wall having a heat reflective lower surface exposed directly to said fuel fired source of radiant heat and reflecting radiant heat downwardly and outwardly away from the source of radiant heat and past said lower edge, said wall means also defining a combustion gases discharging vent above said fuel fired source of radiant heat and normally discharging combustion gases away from the upper portion of said inclined wall whereby to minimize migration of heated combustion gases down readily along said inclined wall, said wall means being continuous and imperforate between the lower edge portion of the inclined wall and vent and entirely around the fuel fired source of radiant heat, and a temperature sensing device disposed adjacent the lower edge of said inclined wall and producing an indication of a rise in temperature of the air and gases adjacent said edge in the event of an unintentional interference of gas discharge at the vent and resulting in flow of gases downwardly along said inclined wall in search of an escape.

16. Fuel burning apparatus directing heat into a space, comprising a fuel fired source of radiant heat, said source also producing incidental heated combustion gases, and means defining an enclosure entirely encompassing said fuel fired source of radiant heat and having an inclined top wall with a lower edge and an upper portion and a heat reflective inner surface, said enclosure having a combustion gases discharging vent adjacent the upper portion of said inclined top wall and normally discharging combustion gases away from the upper portion of said inclined top wall whereby to minimize migration of combustion gases downwardly along said inclined wall and toward the lower edge thereof, said enclosure also having an imperforate radiant heat transmissible panel extending transversely downwardly of said top wall, said panel having an upper edge portion adjacent the lower edge of said top wall and also having a lower portion, said enclosure also having an air inlet opening adjacent the lower edge of said top wall for supplying air for combustion and for sweeping by convection downwardly across said panel and toward the lower portion thereof for cooling the panel, means securing said fuel fired source of radiant heat within the enclosure in generally confronting relation with said panel for directing radiant heat therethrough and in predetermined relation with said top wall for causing heat radiated against the top wall to be reflected outwardly through the panel, and a temperature sensing device disposed adjacent the lower edge of said inclined wall and producing an indication of a rise in temperature of the air and gases adjacent said lower edge in the event of an unintentional interference of gas discharge at the vent and resulting in flow of gases downwardly along said inclined wall in search of an escape and before the heated combustion gases excessively heats said transmissible panel.

17. The fuel burning apparatus of claim 16 and including means controlling operation of said fuel fired source of radiant heat to effect reduction of the heat produced thereby and operating in response to said indications of said temperature sensing device.

18. Fuel burning apparatus directing heat into a space, comprising a generally upright radiant heat transmissible panel,
a radiant heat confining and transmitting duct having heat reflective interior surfaces, said duct having an open heat-discharging end confronting said panel and directing radiant heat therethrough, said duct also having a radiant heat receiving end, said duct extending obliquely upwardly from said panel and defining an unobstructed linear passage between said heat discharging end and said heat receiving end,
means supporting the duct in said predetermined relation with said panel,
a fuel fired source of radiant heat means defining a combustion chamber confining said source having an upwardly directed combustion gases discharging vent, said combustion chamber being connected with said duct and having an open side in open communication with said receiving end and directing the radiant heat into and through the duct and panel and into the spaces to be heated,
and said duct having air inlet means adjacent said heat discharging end and supplying said combustion air to sweep and cool the panel and to supply the fuel fire in the combustion chamber.

19. The invention set forth in claim 1 wherein said duct diverges from said receiving end to said discharging end and said panel having an area considerably in excess of the open side of said combustion chamber, said duct having flat sides with reflective inner surfaces.

20. Fuel burning apparatus directing heat into a space, comprising a radiant heat confining and transmitting duct having heat reflective interior surfaces and defining an unobstructed linear passage therethrough, said duct having an open heat-discharging side and also having a heat receiving portion, said duct having combustion air supply means and extending obliquely upwardly from said heat discharging side and being adapted for mounting with said heat discharging side confronting the space to be heated,
a fuel fired source of radiant heat,
means defining a combustion chamber confining said source of heat having an upwardly directed exhaust vent, said combustion chamber being connected with said duct and having an open side facing said receiving end through which substantially all combustion air therethrough is obtained for the source of heat, and through which radiant heat is directed.

References Cited by the Examiner

UNITED STATES PATENTS

| 677,115 | 6/1901 | Burgess | 126—88 |
| 2,130,086 | 9/1938 | Hart | 126—85 |
| 2,870,827 | 1/1959 | Brockbank | 158—42.4 |
| 3,203,413 | 8/1965 | Hartzell et al. | 126—92 |

FOREIGN PATENTS

| 621,611 | 4/1949 | Great Britain. |

JAMES W. WESTHAVER, *Primary Examiner.*